(No Model.)
W. W. BAILEY.
COTTON CULTIVATOR.
No. 423,655. Patented Mar. 18, 1890.
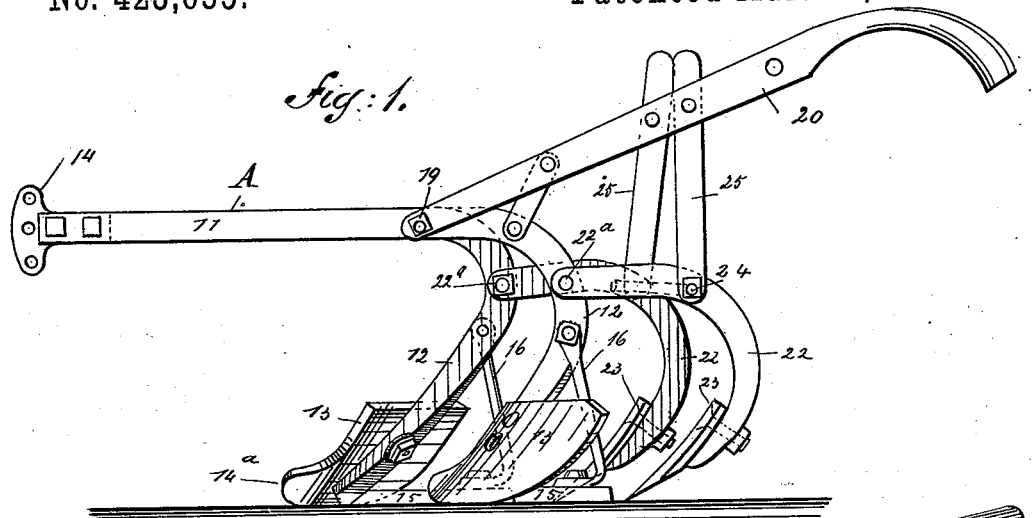
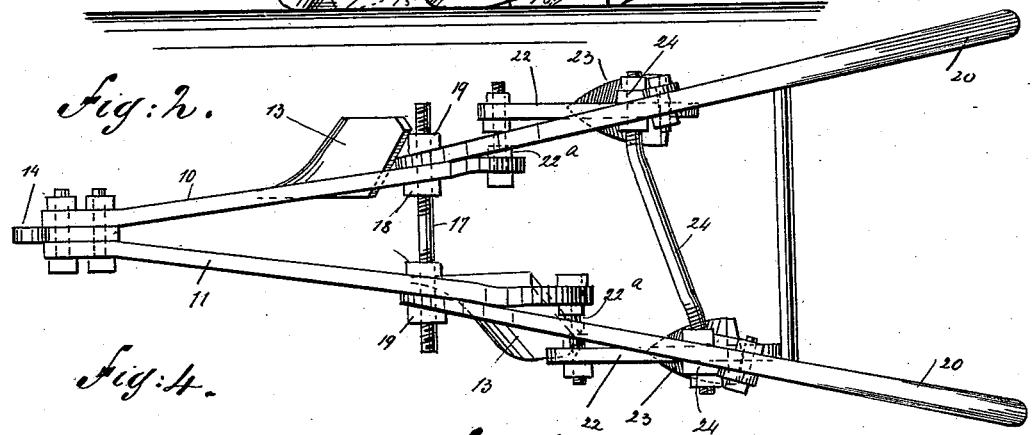
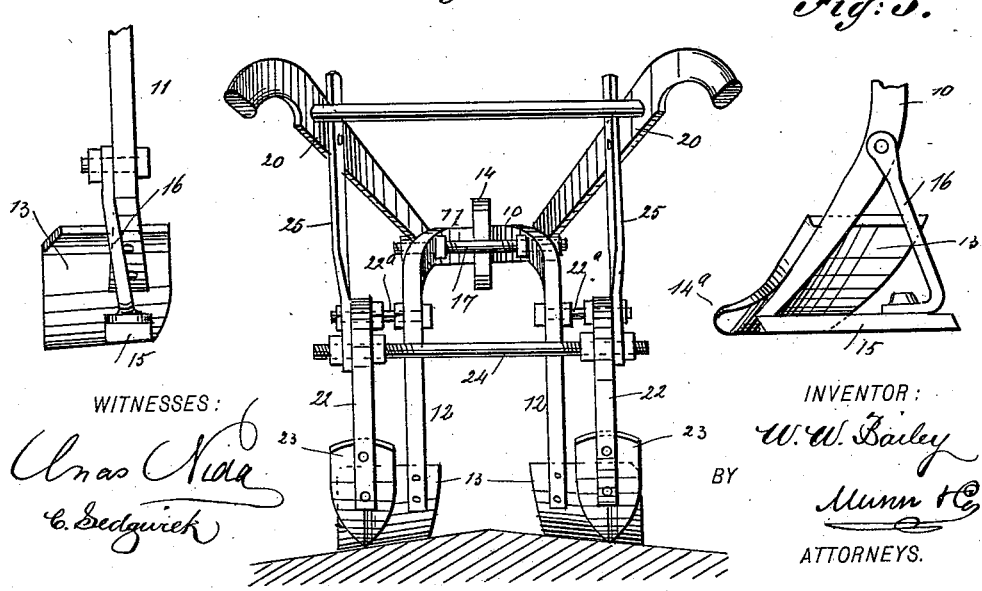
WITNESSES:
Anas Nida
C. Sedgwick
INVENTOR:
W. W. Bailey
BY
Munn & Co.
ATTORNEYS.

UNITED STATES PATENT OFFICE.

WILLIAM WASHINGTON BAILEY, OF ALTUS, ARKANSAS.

COTTON-CULTIVATOR.

SPECIFICATION forming part of Letters Patent No. 423,655, dated March 18, 1890.

Application filed September 13, 1889. Serial No. 323,808. (No model.)

*To all whom it may concern:*

Be it known that I, WILLIAM WASHINGTON BAILEY, of Altus, in the county of Franklin and State of Arkansas, have invented a new and useful Improvement in Cotton-Cultivators, of which the following is a full, clear, and exact description.

My invention relates to an improved cotton-cultivator, and has for its object to provide an implement which will effectually scrape the surface of the ground between the rows of plants at each side of the center, and in cultivating throw the dirt upward over the roots of the plants.

A further object of the invention is to provide an implement of simple and durable construction which will tend to greatly lessen the labor of cultivating a cotton-field.

The invention consists in the novel construction and combination of the several parts, as will be hereinafter fully set forth, and pointed out in the claims.

Reference is to be had to the accompanying drawings, forming a part of this specification, in which similar letters and figures of reference indicate corresponding parts in all the views.

Figure 1 is a side elevation of the implement. Fig. 2 is a plan view. Fig. 3 is a rear elevation. Fig. 4 is a rear view of one of the scrapers, and Fig. 5 is a side elevation of the same.

The stock A of the implement is made in two sections 10 and 11, each consisting of a straight metal bar or beam having the rear end curved downwardly and forwardly, as at 12, and twisted outward in such manner that when the scrapers 13 are attached to the curved ends of the stock the said scrapers will incline outward at an angle of about fifty degress from a vertical line drawn through the sections 10 and 11. The forward ends of the sections 10 and 11 of the stock are securely bolted to the clevis 14, as illustrated in Fig. 1. The right-hand section 10 of the stock is shorter than the left-hand section, the foot being about six inches in advance.

The scrapers 13 consist of a metal plate properly tempered rigidly bolted to the twisted foot of the stock-sections 10 and 11, and the scraper attached to each of the sections is made to extend quite a distance outward from the foot of the stock, as shown in the drawings. The scrapers are provided with a concave upper or front face and a convex or under face, and the inner edge of each scraper at the bottom is turned upward, as illustrated at 14ª in Fig. 1, the purpose of which is to throw the grass and dirt away from the scrapers in the direction of the center of the rows, thereby covering the grass and preventing the same from taking root again. The foot of each stock-section is provided with a shoe 15, rigidly attached at its forward end to the extremity of the curved portion of the stock, the rear end being carried backward, essentially in perpendicular alignment with the rear upper curved surface of the stock-section, and to each shoe a brace-rod 16 is bolted, which rod is carried upward and secured in any suitable or approved manner to the outer face of the said sections, as best illustrated in Figs. 4 and 5. The stock-sections may be drawn close together or carried quite a distance the one from the other by an adjusting device comprising a threaded rod 17, which is passed through an aperture in both of the stock-sections 10 and 11, the said rod being provided between the sections with lock-nuts 18, contacting the opposed faces of the said sections, as shown in Fig. 2, and upon the outer projecting ends of the rod a similar lock-nut 19 is secured.

The handles 20 of the implement, which are made in the shape of ordinary plow-handles, are secured to the stock-sections by passing the rod 17 through the forward ends of the members of the handles and tightly clamping the said members to the stock-sections by manipulating the outer lock-nuts 19. From the outer face of each of the stock-sections, at the curved portion above the attachment of the shoe-braces 16 thereto, a curved arm 22 is rearwardly projected, adapted to form auxiliary stocks, to which any approved form of shovel-plow 23 is attached. These arms are secured to the main stock-sections by means of studs 22ª, as shown in Figs. 2 and 3, which studs are threaded, and the arms are held a suitable distance out from the stock-sections by suitable nuts.

The plows 23 are immediately behind the scrapers 13 and break the ground at or about the center of the scraper-track. These shovel-plows serve to throw the dirt previously scraped upward and outward to the roots of the plants.

The arms 22 are held a proper distance apart and braced by a rod 24, threaded at its ends, the said threaded ends being passed through the arms, and a nut is located at each side of the arms upon the rod, as shown in Fig. 3.

The handles 20 are provided with vertical braces 25, attached at one end to the handles and at the other end to the arms 22 by the connecting-rod 24 and the outer nuts thereon.

It will be observed that if it is desired to simply scrape the ground between the rows of plants the auxiliary stocks carrying the shovel-plows may be readily detached; and it will be further observed that as the implement is driven between the rows of plants the ground adjacent to the opposed rows is simultaneously scraped and cultivated.

When an implement of the above construction is used, time and labor are economized, as the implement at one operation does the work heretofore ordinarily performed by two independent implements.

I desire it to be distinctly understood that the implement may be built for use with a single horse or with a team, the details of construction in both being essentially the same.

Having thus described my invention, I claim as new and desire to secure by Letters Patent—

1. A cultivator comprising the beams 10 and 11, having their downwardly and forwardly curved ends 12 twisted outwardly, the scrapers 13, with the turned-up edges $14^a$, the curved arms 22, secured to the beams and provided with the shovel-plows 23, the handles 20, and the braces 25, secured to the arms 22 and to the handles, substantially as herein shown and described.

2. In a cotton-cultivator, the combination, with a stock comprising two sections of unequal length connected at the forward ends, diverging at the rear, and provided with a downwardly and forwardly curved rear extremity, an adjusting device, substantially as shown and described, connected with the said stock-sections, and a scraper-blade secured to the heel of each of the stock-sections having an outward inclination, of a horizontal shoe secured to the heel of each stock-section, auxiliary downwardly and forwardly curved stocks detachably attached to the main stock-sections, and plows attached to the lower extremities of the said auxiliary stocks, essentially aligning the heels of the main stock-sections, all combined for operation substantially as and for the purpose specified.

WILLIAM WASHINGTON BAILEY.

Witnesses:
 HENRY J. SCHRIVER,
 HENRY L. SCHRIVER.